(12) United States Patent
Haikin et al.

(10) Patent No.: US 7,356,181 B2
(45) Date of Patent: *Apr. 8, 2008

(54) EMBEDDED GAMUT MAPPING ALGORITHM

(75) Inventors: John S. Haikin, Fremont, CA (US); Timothy L. Kohler, San Jose, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 139 days.

This patent is subject to a terminal disclaimer.

(21) Appl. No.: 11/232,921

(22) Filed: Sep. 23, 2005

(65) Prior Publication Data

US 2006/0018536 A1    Jan. 26, 2006

Related U.S. Application Data

(62) Division of application No. 10/449,191, filed on Jun. 2, 2003, now Pat. No. 6,978,043, which is a division of application No. 09/440,067, filed on Nov. 15, 1999, now Pat. No. 6,603,879.

(51) Int. Cl.
*G06K 9/00* (2006.01)

(52) U.S. Cl. .................................. 382/167

(58) Field of Classification Search ........ 382/162–167; 358/1.9, 500–540; 345/589–604; 715/528
See application file for complete search history.

(56) References Cited

U.S. PATENT DOCUMENTS

| | | | |
|---|---|---|---|
| 5,282,046 A | 1/1994 | Yamaguchi | 358/296 |
| 5,319,473 A | 6/1994 | Harrington | 358/518 |
| 5,463,480 A | 10/1995 | MacDonald et al. | 358/520 |
| 5,579,031 A | 11/1996 | Liang | 345/154 |
| 5,634,092 A | 5/1997 | Stokes | 395/118 |
| 5,646,752 A | 7/1997 | Kobler et al. | 358/520 |
| 5,712,925 A | 1/1998 | Ohga | 382/167 |
| 5,731,818 A | 3/1998 | Wan et al. | 358/518 |
| 5,754,184 A * | 5/1998 | Ring et al. | 345/604 |
| 5,774,238 A | 6/1998 | Tsukada | 358/529 |
| 5,806,081 A * | 9/1998 | Swen et al. | 715/528 |
| 5,809,164 A | 9/1998 | Hultgren, III | 382/162 |
| 5,809,213 A | 9/1998 | Bhattacharjya | 395/106 |
| 5,828,780 A | 10/1998 | Suzuki et al. | 382/167 |
| 5,835,098 A | 11/1998 | Lipton | 345/431 |
| 5,875,260 A | 2/1999 | Ohta | 382/162 |
| 5,933,253 A | 8/1999 | Ito et al. | 358/500 |
| 5,938,766 A | 8/1999 | Anderson et al. | 713/100 |

(Continued)

OTHER PUBLICATIONS

Wei-Ling Chu, et al., "ColorSync™: Synchronizing the Color Behavior of Your Devices", Digest of Papers of Compcon (Computer Society Conference), 1996, pp. 440-444.

(Continued)

*Primary Examiner*—Ishrat Sherali
(74) *Attorney, Agent, or Firm*—Fitzpatrick, Cella, Harper & Scinto

(57) ABSTRACT

A color management module which accepts input color image data and transforms the input color image data into output color image data based on information contained in at least one color profile, wherein the color management module includes an interface to an externally provided, pluggable gamut mapping module which is accessed by the color management module to map the input color image data from an input color gamut into an output color gamut.

4 Claims, 9 Drawing Sheets

U.S. PATENT DOCUMENTS

| | | | |
|---|---|---|---|
| 5,963,201 A | 10/1999 | McGreggor et al. | 345/326 |
| 5,999,703 A | 12/1999 | Schwartz et al. | 395/109 |
| 6,088,038 A | 7/2000 | Edge et al. | 345/431 |
| 6,091,518 A | 7/2000 | Anabuki | 358/518 |
| 6,157,735 A | 12/2000 | Holub | 387/167 |
| 6,204,939 B1 | 3/2001 | Lin et al. | 358/518 |
| 6,603,483 B1 | 8/2003 | Newman | 345/593 |
| 6,611,356 B1 | 8/2003 | Shimizu et al. | 358/1.9 |

OTHER PUBLICATIONS

Jan Morovic, et al., "A Universal Algorithm for Colour Gamut Mapping", Proc. CIM 98 Conference, Mar. 27, 1998.

"File Format for Color Profiles", Specification ICC.1:1998-09, International Color Consortium®, 1998.

* cited by examiner

EMBEDDED GAMUT MAPPING ALGORITHM

This application is a division of application Ser. No. 10/449,191, filed Jun. 2, 2003 now U.S. Pat No. 6,978,043, which was a division of application Ser. No. 09/440,067, filed Nov. 15, 1999 now U.S. Pat. No. 6,603,879, which issued as U.S. Pat. No. 6,603,879, on Aug. 5, 2003, the contents of which are all incorporated herein by reference.

BACKGROUND OF THE INVENTION

1. Field of the Invention

The invention concerns a color management system whereby a gamut mapping algorithm can be embedded within a color management profile such that a custom or special-purpose gamut mapping algorithm can be externally supplied to a color matching module for mapping color image data from one color gamut to another.

2. Description of the Related Art

The use of digital devices to record, process, view and output color images is increasing due to the growing use of the world wide web, digital cameras, and computing devices with ever-increasing processing power. In order for a particular color image to appear the same on an output device as it did on an input device, the color image data corresponding to the color image is usually processed prior to being depicted by the output device. For example, a computer user may import a color image, such as a photograph, and edit the image to the user's satisfaction while viewing the image on a color monitor, after which the user may wish to print the image on an attached printer, such as a color bubble jet printer. Without color management processing, the color image will probably not appear the same when printed out by the printer as it did on the monitor.

The difference in appearance of the color image between the two device occurs because the monitor and the printer use different types and combinations of colorants to produce the color image. A monitor uses light on a black screen to produce color pixels in a color image and a color bubble jet printer uses ink on white paper to produce color. Therefore, a color matching process is typically used prior to sending the color image data to the output device to convert a color image from the colorant space of the input device to the colorant space of the output device so that the output device can generate a color image with the same, or similar, appearance as that produced by the input device.

In addition to the difference in color spaces between the input device and the output device, there also usually exists a difference between the color gamuts of the two devices. For instance, a printer may have a color gamut boundary that is incapable of representing the full range of the color green displayed on the color monitor. In such a case, the color image data is modified by a gamut mapping algorithm (GMA) in order for the printer to reasonably represent the out-of-gamut green pixels of the input image. Therefore, the gamut mapping process is also typically applied to the color image data in order to bring the out-of-gamut color pixels within the color gamut of the output device. These two functions, color matching and gamut mapping, are typically applied by a color management system within a computer or other digital device.

Many currently used color management systems utilize a color management module (CMM) whereby input color image data representing an input image is transformed from the colorant space of the input device into a device and viewing condition independent appearance space. This transformation typically utilizes a color transformation table contained in a color profile for the input device. Next, a gamut mapping algorithm (GMA), which is typically contained in the CMM, is applied to the color image data in the device and viewing condition independent appearance space. The GMA modifies the color image data in an effort to ensure that it can be represented by the output device by adjusting the out-of-gamut data points to be within the color gamut boundary of the output device.

There are several different types of gamut mapping algorithms currently in existence; however, the type of gamut mapping algorithm available in a given CMM is typically within the sole control of the developer of the CMM. Some GMAs require the color gamut boundaries of both the input device and output device in order to perform gamut mapping on the color image data. After the GMA is applied, the color image data is transformed from the device and viewing condition independent appearance space to the output device colorant space. This transformation typically utilizes a color transformation table contained in a color profile for the output device. The color image data is then sent to output device to be rendered.

Different types of GMAs utilize different methodologies and techniques of gamut mapping for modifying the color image data to fit within the color gamut boundary of the output device. Typically, each CMM includes at least one GMA which is provided by the developers of the CMM. Some CMMs provide multiple GMAs to select from depending on the GMAs that the developers of the CMM decided to include. There are many circumstances, such as when using special applications or improved printer drivers, when either a specific GMA or a custom GMA is desired by an independent developer who is not associated with the developers of the CMM. Currently there are only two basic options available to an independent developer who wishes to control the selection and application of a specific GMA to color image data.

First, an independent developer may choose one of the few GMAs that are provided in the CMM, if more than one is provided, but even then the independent developer has no control over how the selected GMA is specifically applied to the color image data. In the alternative to selecting a GMA provided in the CMM, the independent developer may provide a color profile for use by the CMM in which a specific GMA has been pre-applied to the color transformation table of the color profile. Unfortunately, this pre-applied GMA can only be utilized when the specific color profile containing the modified color transformation table is provided to the GMA. In addition, the independent developer must somehow be capable of instructing the CMM not to use its default GMA in such a situation.

In sum, the known art is not seen to provide a color management system whereby an independent developer can supply a custom or special-purpose GMA from an external source to a CMM for application to color image data.

SUMMARY OF THE INVENTION

The present invention addresses the foregoing problems by providing a color management system whereby an independent developer can supply a custom or special-purpose GMA from an external source to a CMM for application to color image data.

Specifically, a first embodiment of the present invention is directed to a color management module which accepts input color image data and transforms the input color image data into output color image data based on information contained in at least one color profile. The color management module includes an interface to an externally provided, pluggable gamut mapping module which is accessed by the color management module to map the input color image data from a first color gamut into a second color gamut.

Preferably, the externally provided, pluggable gamut mapping module is provided in a color profile, such as a color profile corresponding to an output device. The color profile is preferably a tagged file which contains specific tags to indicate the presence of a pluggable gamut mapping module, the type of pluggable gamut mapping module present, and the name of the pluggable gamut mapping module. In addition, the pluggable gamut mapping module is preferably capable of comprising either a set of computer-readable instructions implementing a gamut mapping algorithm, a list of parameters for configuring a general-purpose gamut mapping algorithm contained in the color management module, or a combination of parameters and functions for configuring such a general-purpose gamut mapping algorithm.

By virtue of the foregoing arrangement, a color management system is provided whereby a color management module can receive, from an external source such as a color profile, either a custom gamut mapping algorithm or a list of parameters and functions for configuring a general-purpose gamut mapping algorithm into a specific gamut mapping algorithm. In this manner, an independent developer can control the type and application of gamut mapping algorithm which is used for mapping color image data from one color gamut to another.

In another aspect of the present embodiment, a color management module is provided which accepts input color image data and transforms the input color image data into output color image data based on information contained in at least one color profile. The color management module includes an interface to an externally provided, pluggable gamut mapping module which is accessed by the color management module to map the input color image data from a first color gamut into a second color gamut. The pluggable gamut mapping module is contained in a color profile and comprises a list of parameters for use by a general-purpose gamut mapping algorithm which is contained in the color management module, whereby the general-purpose gamut mapping algorithm is configured by the list of parameters to enable the general-purpose gamut mapping algorithm to function as a specific gamut mapping algorithm.

By virtue of the foregoing arrangement, a color management system is provided whereby a color management module can receive, from an external color profile, a list of parameters for configuring a general-purpose gamut mapping algorithm into a specific gamut mapping algorithm. In this manner, an independent developer can control the type and application of gamut mapping algorithm which is used for mapping color image data from one color gamut to another.

The embodiments of the invention described above, and other embodiments, may also be provided in other forms, such as a computing device for managing color image data, a method for managing color image data, computer-executable process steps for managing color image data, and a computer-readable medium for storing computer-executable process steps to managing color image data.

Another embodiment of the invention is directed to a color profile for use with a color management module wherein the color profile contains a pluggable gamut mapping module which is accessible by the color management module through an interface in the color management module, and wherein the pluggable gamut mapping module is used by the color management module to map color image data from a first color gamut into a second color gamut.

By virtue of the foregoing arrangement, a color profile is provided for use in a color management system whereby the color profile contains a pluggable gamut mapping module for mapping color image data from one color gamut to another. In this manner, an independent developer can control the type and application of gamut mapping algorithm which is used for mapping color image data from one color gamut to another.

In yet another embodiment, a color profile is provided for use with a color management module wherein the color profile contains a pluggable gamut mapping module which is accessible by the color management module through an interface in the color management module, wherein the pluggable gamut mapping module comprises a list of parameters which are used to configure a general-purpose gamut mapping algorithm contained in the color management module thereby enabling the general-purpose gamut mapping algorithm to function as a specific gamut mapping algorithm for mapping color image data from a first color gamut into a second color gamut.

By virtue of the foregoing arrangement, a color profile is provided for use in a color management system whereby the color profile contains a pluggable gamut mapping module comprised of a list of parameters which is used to configure a general-purpose gamut mapping algorithm contained in the color management module. In this manner, an independent developer can select the type of gamut mapping algorithm and control its application to map color image data from one color gamut to another.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

The present invention is generally directed to a color management system that includes a color management module and that has the capability to interface to a pluggable gamut mapping algorithm which is provided from a source external to the color management module. The present invention can be implemented in color management systems which are used to map color image data from the color space of one device, such as a monitor, to the color space of another device, such as a printer. For example, a color management system according to the present invention may be incorporated in an output device driver in a computing device, such as a printer driver, embedded in the firmware of an output device, such as a printer, or provided in a stand-alone color management application for use on a general purpose computer. It can be appreciated that the present invention is not limited to these embodiments and that the present invention may be used in other environments in which color management is used.

Figure 1:
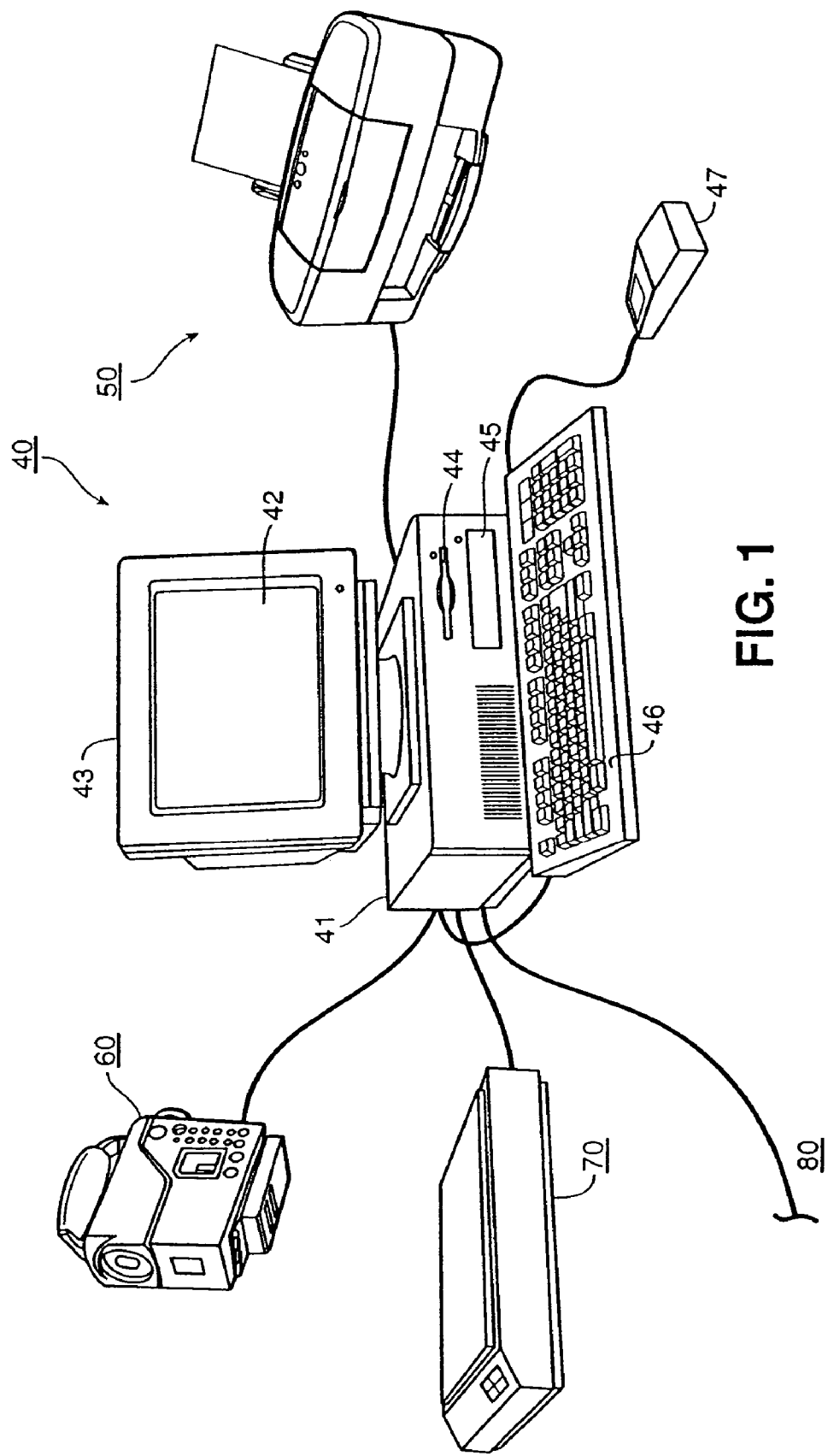
FIG. 1 is a representative view of a computer system in which the present invention may be implemented.

FIG. 1 is a view showing the outward appearance of a representative computing system including computing equipment, peripherals and digital devices which may be used in connection with the practice of the present invention. Computing equipment 40 includes host processor 41 which comprises a personal computer (hereinafter "PC"), preferably an IBM PC-compatible computer having a windowing environment such as Microsoft Windows 95, Windows 98 or Windows NT, although it may be a Macintosh or a non-windows based computer. Provided with computing equipment 40 are color monitor 43 including display screen 42, keyboard 46 for entering text data and user commands, and pointing device 47. Pointing device 47 preferably comprises a mouse for pointing and for manipulating objects displayed on display screen 42.

Computing equipment 40 includes a computer-readable memory medium such as computer fixed disk 45 and/or floppy disk drive 44. Floppy disk drive 44 provides a means whereby computing equipment 40 can access information, such as image data, computer-executable process steps, application programs, etc. stored on removable memory media. A similar CD-ROM interface (not shown) may be provided for computing equipment 40 through which computing equipment 40 can access information stored on removable CD-ROM media.

Printer 50 is a printer, preferably a color bubble jet printer, which forms color images on a recording medium such as paper or transparencies or the like. The invention is usable with other printers, however, so long as the printer is capable of being interfaced to computing equipment 40. In addition, digital color scanner 70 is provided for scanning documents and images into computing equipment 40 and digital color camera 60 is provided for sending digital images to computing equipment 40. Of course, computing equipment 40 may acquire digital image data from other sources such as a digital video camera or from a local area network or the Internet via network interface bus 80.

Figure 2:
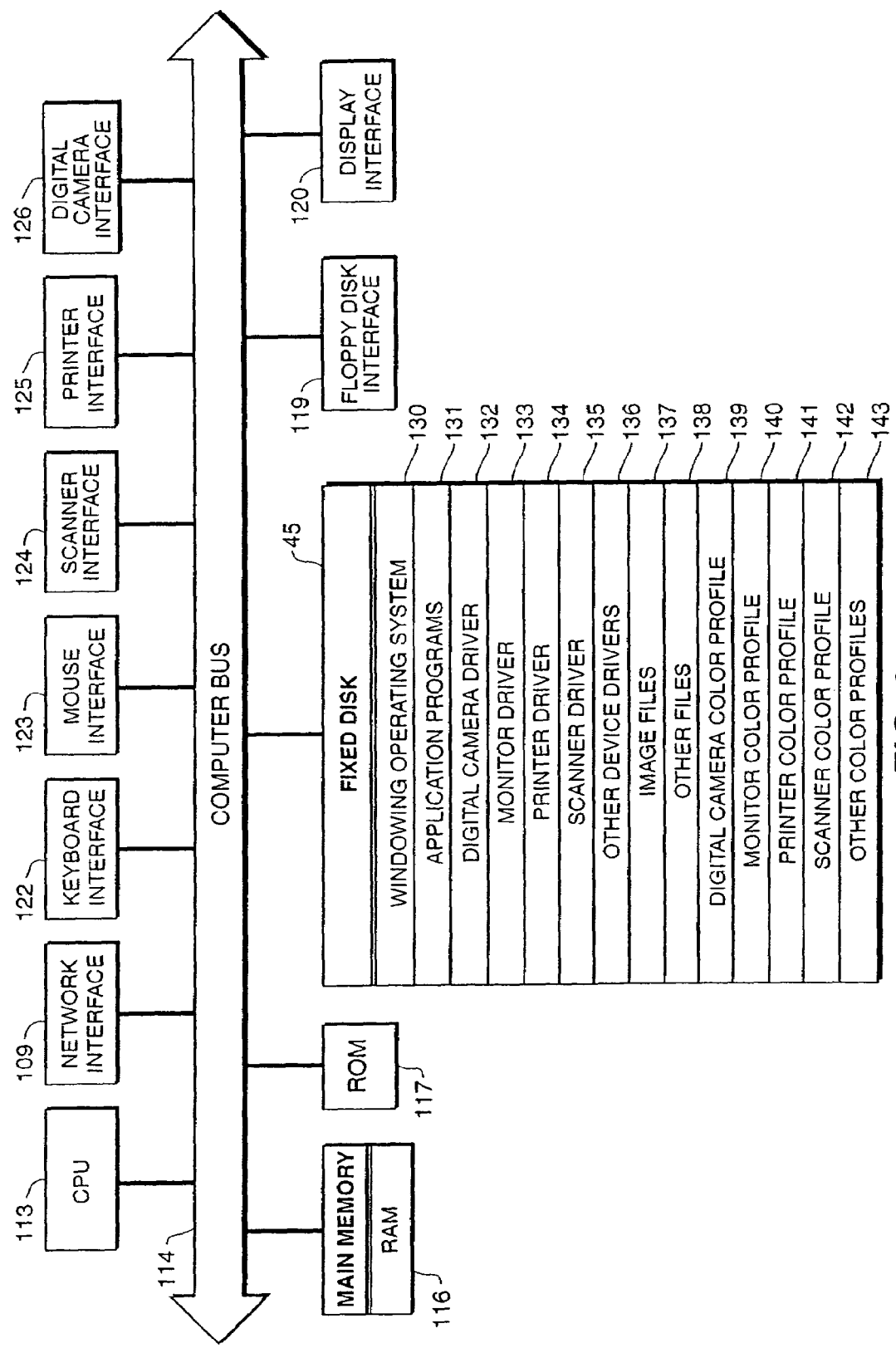
FIG. 2 is a detailed block diagram showing the internal architecture of the computer equipment shown in the computer system of FIG. 1.

FIG. 2 is a detailed block diagram showing the internal architecture of host processor 41 of computing equipment 40. As shown in FIG. 2, host processor 41 includes central processing unit (CPU) 113 which interfaces with computer bus 114. Also interfacing with computer bus 114 are fixed disk 45, network interface 109, random access memory (RAM) 116 for use as main memory, read only memory (ROM) 117, floppy disk interface 119, display interface 120 to monitor 43, keyboard interface 122 to keyboard 46, mouse interface 123 to pointing device 47, scanner interface 124 to scanner 70, printer interface 125 to printer 50, and digital camera interface 126 to digital camera 60.

Main memory 116 interfaces with computer bus 114 so as to provide RAM storage to CPU 113 during execution of software programs such as an operating system, application programs and device drivers. More specifically, CPU 113 loads computer-executable process steps from fixed disk 45, another storage device, or some other source such as a network, into a region of main memory 116. CPU 113 then executes the stored process steps from main memory 116 in order to execute software programs such as an operating system, application programs and device drivers. Data such as color images can be stored in main memory 116, where the data can be accessed by CPU 113 during the execution of computer-executable process steps which use or alter the data.

As also shown in FIG. 2, fixed disk 45 contains operating system 130, which is preferably a windowing operating system although other operating systems may be used, application programs 131, such as image processing applications that include a color management module, and plural device drivers, including a digital camera driver 132, monitor driver 133, printer driver 134, scanner driver 135, and other device drivers 136. Fixed disk 45 also includes image files 137, other files 138, digital camera color profile 139 for digital camera 60, monitor color profile 140 for monitor 43, printer color profile 141 for printer 50, scanner color profile 142 for scanner 70, and other color profiles 143 for other devices and peripherals (not shown). The present invention is preferably performed by computer-executable process steps which are stored on fixed disk 45 for execution by CPU 113, either as an integrated part of a device driver, such as printer driver 134, or as one of application programs 131 for performing image processing.

Figure 3:
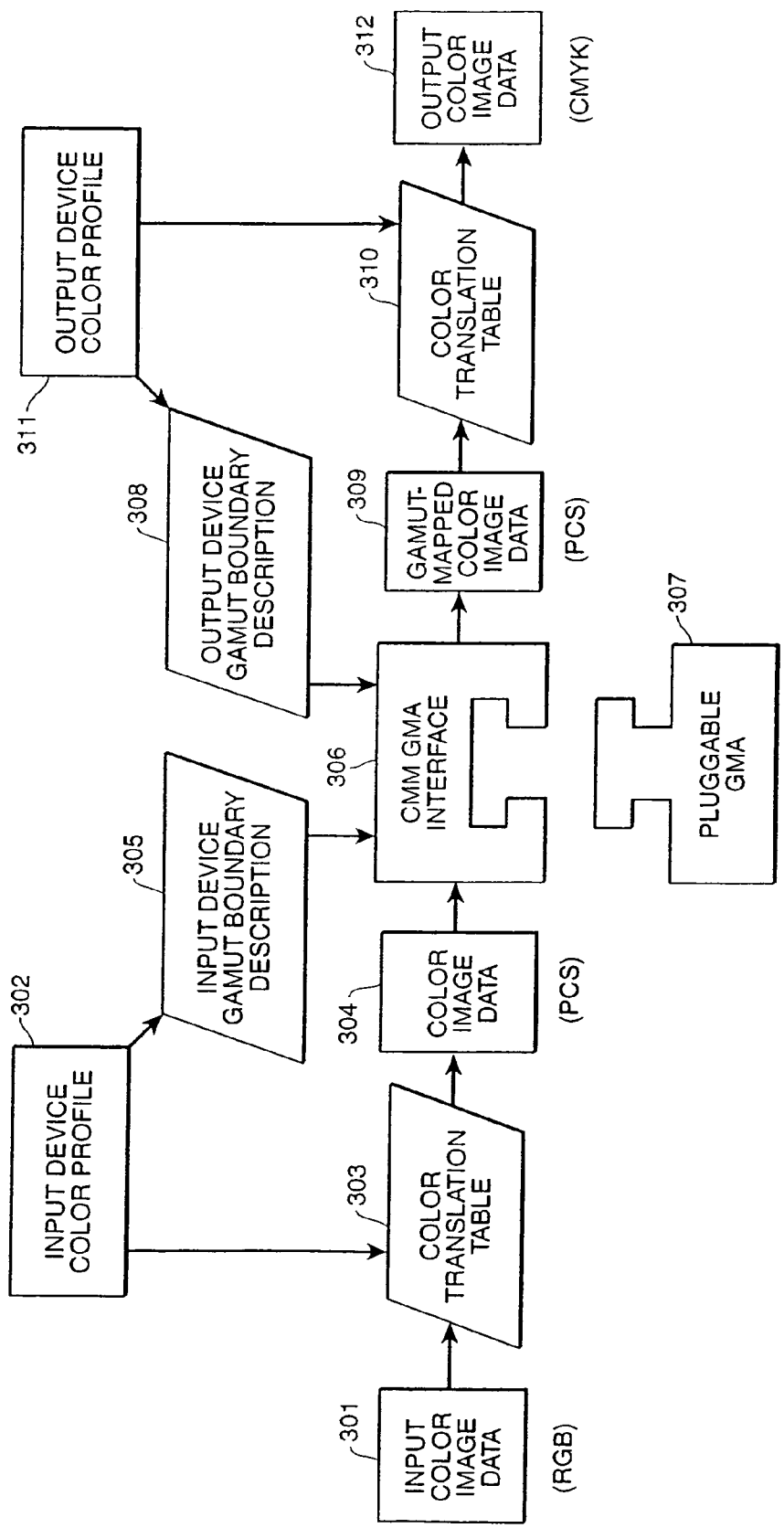
FIG. 3 is a view for providing a system level explanation of a color management system according to the invention.

FIG. 3 is a system-level view for providing an explanation of a color management process in which the present invention is incorporated. In general, the invention is directed to a pluggable gamut mapping algorithm (GMA) which is provided from a source external to a color management module (CMM) and which is used by the CMM in order to map color image data from an input device into the gamut boundary of an output device. Specifically, the pluggable gamut mapping algorithm can be provided externally from a color profile, such as an output device color profile, or from some other external storage means such as a local memory area, CD-ROM, or from a source accessible via a network, such as the Internet or world wide web. By this means, a gamut mapping algorithm can be provided by a developer who is not associated with the development or creation of the color management module, whereby the independent developer can control the type of GMA applied to color image data and the manner in which that GMA is specifically applied.

In addition, the use of an externally provided pluggable GMA allows a specific type of GMA to be associated with a particular color profile for use by the color management module of a color management system, thereby allowing a specific GMA to be associated with a particular color image rendering device, such as a printer or monitor.

As mentioned above, the present invention is preferably performed by computer-executable program steps which are stored on fixed disk 45 of host processor 41 for access by main memory 116 and subsequent execution by CPU 113. Preferably, the color management module of the present invention is integrated into a particular device driver, such as printer driver 134, or is provided in an image processing application program, such as one of application programs 131. In addition, the pluggable GMA of the present invention is preferably provided in a color profile corresponding to an image rendering device, such as printer color profile 141 provided on fixed disk 45. It can be appreciated, however, that the present invention may be carried out through other means such as a stand-alone module of computer-executable program steps or by implementation in hardware using technologies such as ASICs.

Turning to FIG. 3, one embodiment of the present invention for performing color management begins by obtaining input color image data 301 from an input device such as digital camera 60, scanner 70, or an image file retrieved from the Internet via network interface bus 80. For example, color image data corresponding to an image may be obtained from scanner 70 which scans an image and provides color image data to host processor 41 in RGB (red, green, blue) color space. After the color image data corresponding to an image is obtained, the input device color profile 302 is accessed from fixed disk 45 for use in the color management system. Input device color profile 302 contains input device color translation table 303 and input device gamut boundary description 305. Input device color translation table 303 is accessed and is used to transform input color image data 301 from the input device color space of RGB into color image data 304 which is in a device and viewing condition independent color space. The device and viewing condition independent color space is a standardized color space which is independent of any particular image rendering device or viewing condition. Such a color space is commonly referred to as a profile connection space (PCS) because it is a neutral color space in which color image data in a first color space can be transformed into a second color space. Such a standardized device and viewing condition independent color space can be transformed through the use of a color appearance model such as CIECAM97s. Preferably, the color profiles used with the present invention, such as those provided on fixed disk 45, are International Color Consortium (ICC) device profiles. ICC device profiles have a standardized format for containing a color translation table and a gamut boundary description which correspond to a specific device.

Once color image data 304 is in device and viewing condition independent color space, it is ready for gamut mapping in order to ensure that the color image data will be within the color gamut boundary of the output device on which the color image data will ultimately be rendered. As discussed above, this gamut mapping step is performed because an output device, such as a printer, may not be capable of rendering all colors to the same degree as that of the input device from which color image data was initially obtained. As can be seen in FIG. 3, the color management module provides GMA interface 306 for receiving pluggable gamut mapping algorithm 307 from an external source. Preferably, pluggable gamut mapping algorithm 307 is provided in output device color profile 311. In this manner, the developers of the output device color profile can custom-tailor the pluggable GMA 307 for optimum color image rendering on the output device which corresponds to output device color profile 311. Therefore, pluggable GMA 307 is accessed by CMM GMA interface 306 and is used in conjunction with input device gamut boundary description 305 and output device gamut boundary description 308 to perform gamut mapping on color image data 304 in order to provide gamut-mapped color image data 309.

After gamut mapping of color image data 304, the resultant gamut-mapped color image data 309 is still in device and viewing condition independent color space and therefore needs to be transformed into the color space of the output device before being sent to the output device for rendering of the color image data. Thus, output device color translation table 310 is obtained from output device color profile 311 for transforming gamut-mapped color image data 309 into output color image data 312, which is in output device color space. For example, if the output device is a color printer, such as a bubble-jet color printer, then the output device operates in what is known as CMYK (cyan, magenta, yellow, black) color space. As discussed above, this is because a bubble-jet color printer uses different colorants in order to render a color image in contrast to other color image devices, such as a monitor, which use red, green and blue colorants to render the color image. After gamut-mapped color image data 309 is transformed to output color image data 312, it can subsequently be sent to the output device for rendering of the color image.

In this manner, it can be appreciated that an independent developer can provide a specific gamut mapping algorithm, or can provide parameters or functions to configure a general-purpose gamut mapping algorithm, for use by a color management module even though the independent developer had no control over the creation and development of the color management module. Therefore, the present invention provides control to independent developers to select and create a customized GMA which works best for a particular color image device, a particular type of image, or a particular set of viewing conditions.

Figure 4:
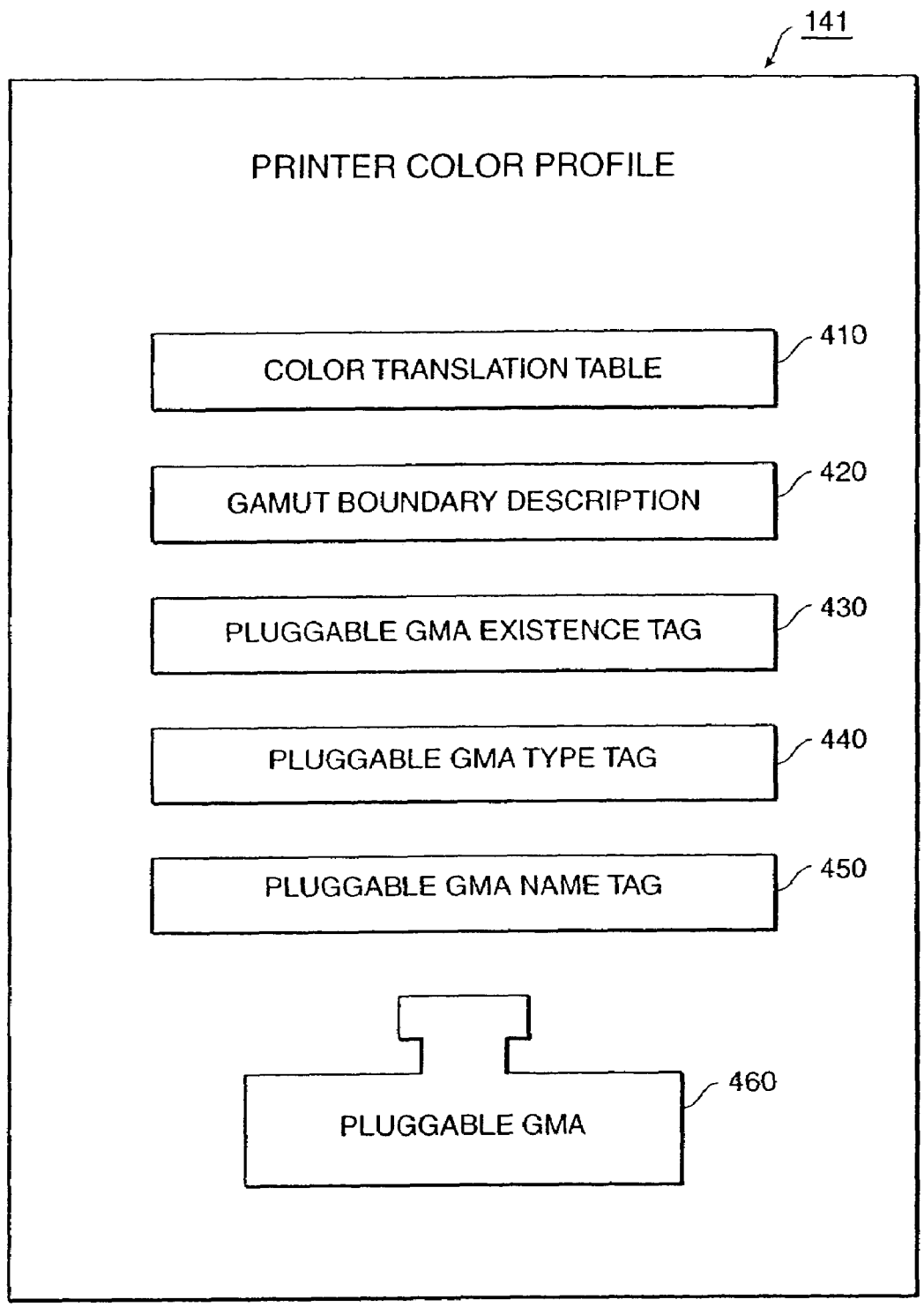
FIG. 4 is a view for providing an explanation of a color profile according to one embodiment of the invention.

FIG. 4 provides a view for explaining and illustrating a printer color profile according to the present invention for containing a pluggable gamut mapping algorithm. As discussed above, a pluggable gamut mapping algorithm according to the present invention can be externally provided to the CMM by any number of means, including being provided in color profiles, memory storage means, and the Internet. As seen in FIG. 4, pluggable gamut mapping algorithm 460 is provided in printer color profile 141 for use in a color management system as depicted in FIG. 3. Preferably, printer color profile 141 contains color translation table 410 which is utilized in the color management system in order to transform color image data from a first color space into the color space of the printer corresponding to printer color profile 141. In addition, printer color profile 141 includes gamut boundary description 420 which describes the limits of the ranges of color which the printer corresponding to printer color profile 141 is capable if representing. In the preferred mode, the gamut boundary descriptions of the input or display device, such as a monitor, and the output device, such as a color bubble-jet printer, are utilized in pluggable gamut mapping algorithm 460 in order to map color image data into the gamut boundary of the output device.

Also provided in printer color profile 141 are three separate and distinct tags which are associated with pluggable gamut mapping algorithm 460. The first tag is pluggable GMA existence tag 430 which indicates whether or not a pluggable GMA is present within printer color profile 141. In this manner, CMM GMA interface 306 is able to detect whether or not a particular color profile, such as printer color profile 141, contains a pluggable gamut mapping algorithm for use in the color management system. Next, pluggable GMA type tag 440 is provided to indicate the type of pluggable GMA 460 that is provided in printer color profile 141. Last, pluggable GMA name tag 450 is provided so that a specific pluggable GMA may be identified to CMM GMA interface 306 by name. As discussed above, pluggable GMA 460 is provided in printer color profile 141 for subsequent access by CMM GMA interface 306 for use in the subsequent gamut mapping of color image data as depicted in FIG. 3. As evidenced by the presence of the GMA-related tags, printer color profile 141 is preferably a tagged file in which tags are used to identify and contain all data contained in printer color profile 141 according to a predetermined, standardized color-profile format which may or may not be extensible. As can be appreciated from FIG. 4, printer color profile 141 provides a means for an independent developer, such as a printer manufacturer, to indicate the presence of a pluggable GMA and to provide a custom-tailored pluggable GMA for optimum output of a color image by the printer which is associated with printer color profile 141. Therefore, the present invention provides a means to free independent developers from the limited choice of GMA which is typically provided in a color management module and gives the independent developers control, not only to create and develop their own custom-tailored GMAs, but also to instruct an off-the-shelf color management module to use the custom-tailored GMA.

Figure 5A:
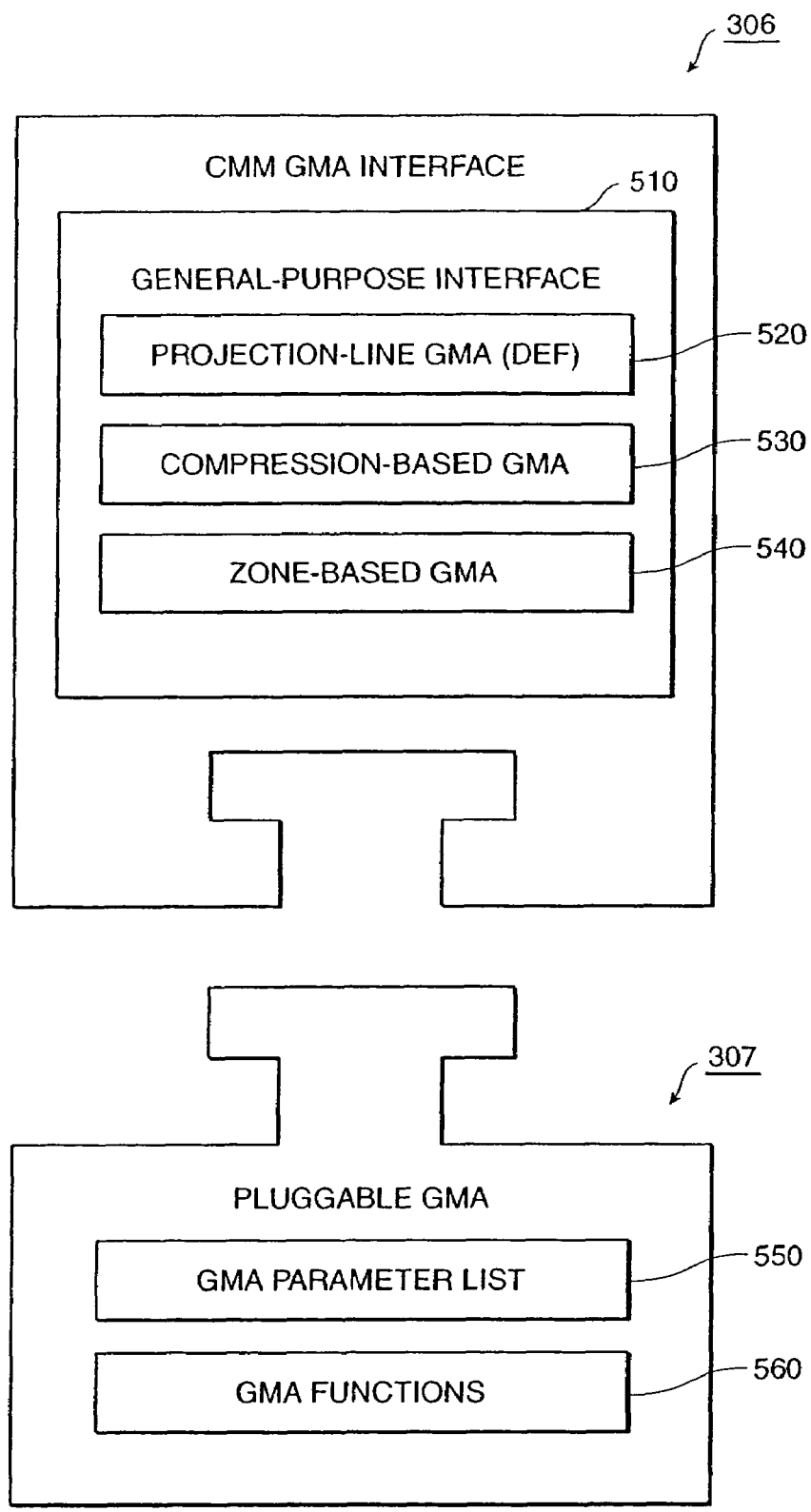
FIG. 5A is a view for providing a system level explanation of a pluggable gamut mapping algorithm according to a first embodiment of the invention.

FIG. 5A provides a view for explaining the system-level interaction of a pluggable GMA according to one embodiment of the present invention. As can be seen from inspection of FIG. 5A, pluggable GMA 307 is for use with CMM GMA interface 306 in order to perform gamut mapping of color image data as depicted in FIG. 3. In this embodiment of the present invention, CMM GMA interface 306 contains general-purpose GMA 510 which provides several different types of gamut mapping algorithms and which can be configured and custom-tailored by pluggable GMA 307 which is provided from a source external to the color management module. Specifically, general-purpose GMA 510 contains projection-line GMA 520 which brings color image data within a given gamut boundary by projecting an out-of-gamut data point along a predetermined line until it is within the color gamut boundary. In addition, compression-based GMA 530 is provided in which out-of-gamut data points which are outside a given gamut boundary are scalably compressed to fit within the given gamut boundary. Also provided is zone-based GMA 540 in which out-of-gamut data points are adjusted to be within a particular zone that is within the given gamut boundary. In this manner, it can be appreciated that an independent developer has the capability of choosing one of these three types of gamut mapping algorithms for optimum results when rendering the gamut-mapped color image data on a particular color image device.

In addition to having the capability to select the type of gamut mapping algorithm to be used by the general-purpose GMA, each of the GMAs provided in the general-purpose GMA are preferably configured and adjusted by means of various parameters which are provided externally from pluggable GMA 307. In addition to configuring and adjusting each type of GMA provided in general-purpose GMA 510, each type of GMA also preferably has the capability of being modified by incorporating functions which are externally provided from pluggable GMA 307. In this manner, one or more components of a specific type of GMA in general-purpose GMA 510 can be externally provided in order to custom-tailor the specific type of GMA. Therefore, pluggable GMA 307 preferably has GMA parameter list 550 which contains a list of parameters that indicates which type of GMA is to be used by general-purpose GMA 510, and which also contains parameters to selectively configure and adjust the selected type of GMA.

For example, GMA parameter list 550 may contain a first parameter which indicates that projection-line GMA 520 is to be used, and may also contain other parameters to modify the projection-line gamut mapping algorithm in order to custom-tailor it to optimize results with a specific color image device. In addition, GMA functions 560 is provided in pluggable GMA 307 which includes one or more functions for access by CMM GMA interface 306 in order to modify the selected type of GMA. The functions provided in GMA functions 560 may either be in the form of computer-executable program steps for use on a specific computing platform, or may be provided in the form of an interpretative code such as JAVA or BASIC. Thus, the embodiment illustrated in FIG. 5A provides general-purpose GMA 510 which presents several options to an independent developer for selecting a specific type of GMA and also for configuring and modifying the chosen specific type of GMA to suit the needs of the independent developer. In addition, and as illustrated in FIG. 5A, general-purpose GMA 510 identifies one of the types of GMAs as a default GMA to be used in the event that a pluggable GMA is not provided or cannot be found by CMM GMA interface 306.

Figure 5B:
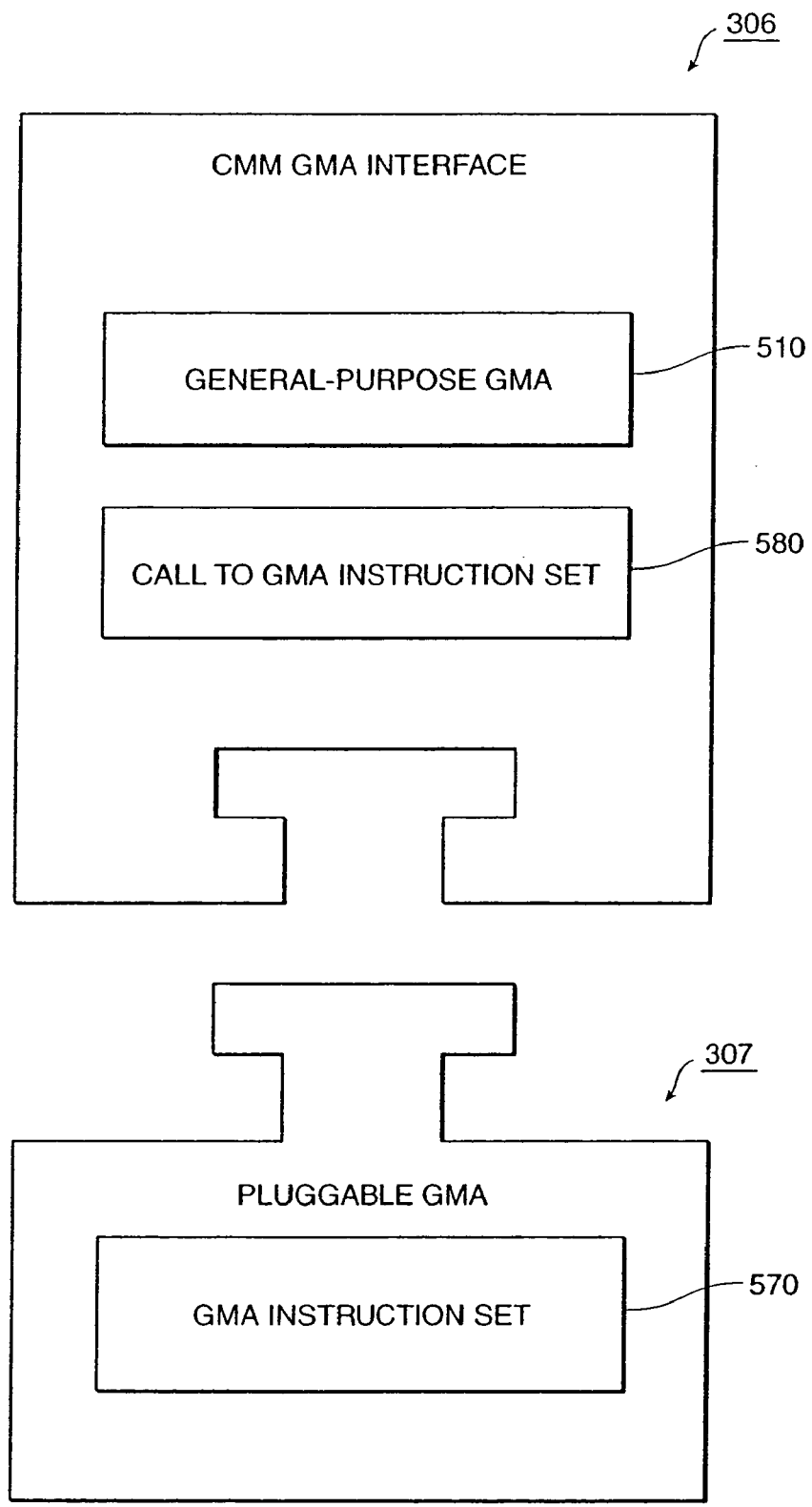
FIG. 5B is a view for providing a system level explanation of a pluggable gamut mapping algorithm according to a second embodiment of the invention.

In the alternative, a second embodiment of the present invention is illustrated in FIG. 5B in which an entire, self-contained gamut mapping algorithm is externally provided to CMM GMA interface 306 from pluggable GMA 307 for mapping color image data to be within a given gamut boundary description. In this embodiment, the entire, self-contained GMA is provided in pluggable GMA 307 in the form of GMA instruction set 570. GMA instruction set 570 comprises instructions to be carried out by a processor or computing device in order to perform a gamut mapping algorithm. Thus, it can be appreciated that an individual developer can create and develop a unique gamut mapping algorithm and can provide it in an external source, such as a color profile, for access and use by CMM GMA interface 306 for mapping color image data to be within a given color gamut boundary. As can be seen in FIG. 5B, CMM GMA interface 306 also has general-purpose GMA 510 in the event that GMA instruction set 570 is not provided. In such a situation, the default GMA of general-purpose GMA 510 can be used as depicted in FIG. 5A. In this manner, an off-the-shelf color management module can be used to provide an individual developer with several options for controlling the type of gamut mapping algorithm used in the color management system and for controlling the particular manner in which the gamut mapping algorithm is applied.

Figure 6:
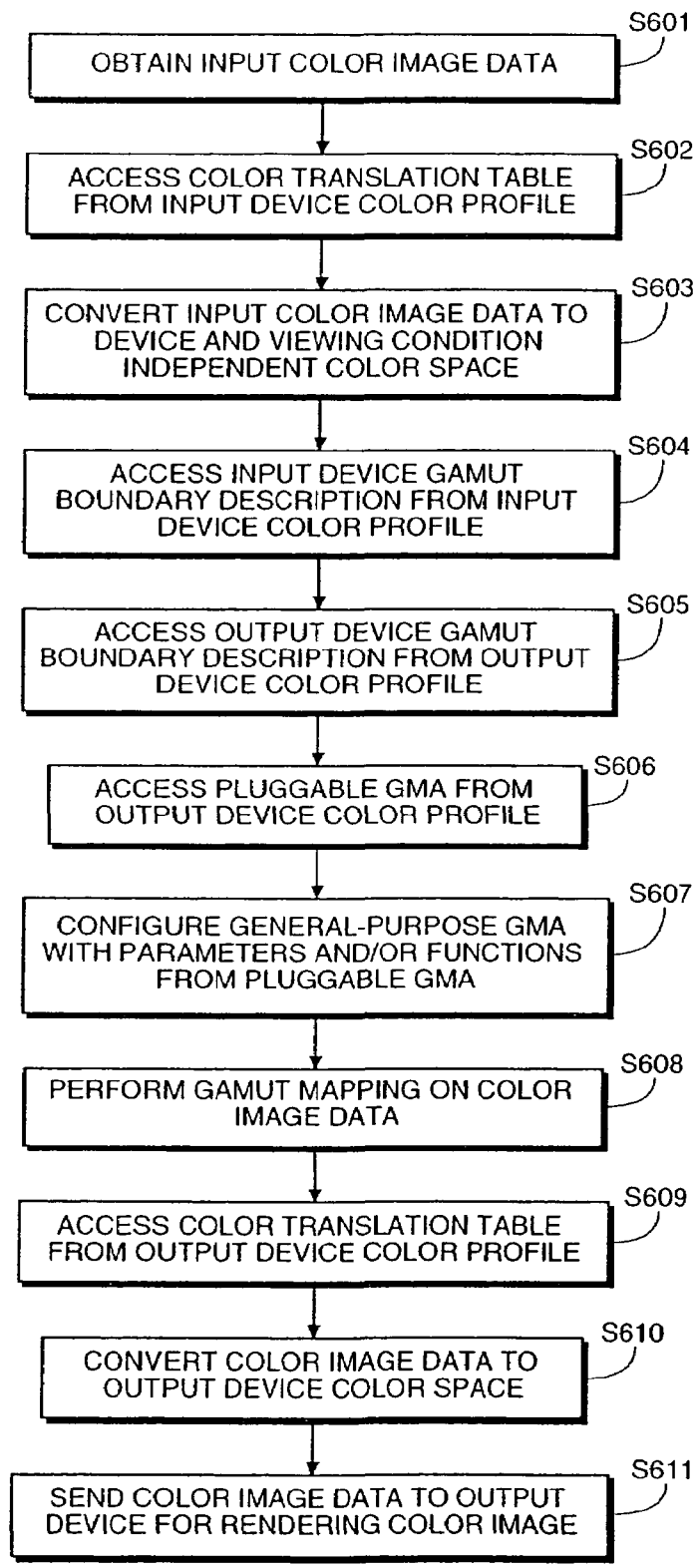
FIG. 6 is a flowchart for providing a detailed explanation of a color management system according to a first embodiment of the invention.

FIG. 6 provides a flowchart for explaining a color management system for transforming color image data using a pluggable gamut mapping algorithm according to the embodiment of the present invention depicted in FIG. 5A. In general, the color management system described by the flowchart in FIG. 6 obtains input color image data and then transforms the input color image data into a device and viewing condition independent color space. A pluggable gamut mapping algorithm comprised of a parameter list and function list is then obtained by the color management module, after which a general-purpose gamut mapping algorithm contained in the color management module is configured using the parameters and functions obtained from the pluggable GMA. The configured, general-purpose GMA is then applied to the color image data by utilizing the gamut boundary descriptions of the input and output devices. After gamut-mapping, the color image data is transformed to the color space of the output device and is then sent to the output device to be rendered.

Turning to FIG. 6, input color image data is obtained which is in an input device color space which corresponds to the input device from which the color image data originated (step S601). As discussed above, the input color image data may have been obtained from scanner 70, digital camera 60, fixed disk 45, or from the Internet or world wide web via network interface bus 80. The color translation table corresponding to the input device is then accessed from the input device color profile in step S602. The color translation table is then used to convert the color image data from the input device color space to a device and viewing condition independent color space, which is commonly known as a profile connection space (PCS) (step S603). Once the color image data is transformed into the device and viewing condition independent color space, it is ready for gamut mapping to ensure that all data points of the color image data are within the gamut boundary of the output device. In preparation for performing gamut mapping, the gamut boundary description of the input device is accessed from the input device color profile in step S604. Similarly, the gamut boundary description of the output device is accessed from the output device color profile in step S605.

In step S606, the color management module accesses the pluggable GMA from the output device color profile. Although the pluggable GMA is provided in the output device color profile in this example of the invention, the pluggable GMA may be provided in other color profiles, such as an abstract color profile, and also may be provided by other means such as an independent file stored on fixed disk 45 or on a CD-ROM, or may be obtained from the Internet or world wide web via network interface bus 80. In addition, pluggable GMAs may be provided in more than one color profile, in which case the color management module must decide which pluggable GMA to use. The preferred order of preference for selecting which pluggable GMA to use is illustrated in detail in FIG. 8 and is discussed further below. The pluggable GMA accessed from the output device color profile contains a list of parameters and a list of functions as depicted in FIG. 5A. As discussed above, the parameters and functions are used to select and configure a specific type of GMA contained in general-purpose GMA 510 of CMM GMA interface 306. The general-purpose GMA contained in the CMM is configured in step S607 with the parameters and/or functions provided in the pluggable GMA which was accessed from the output device color profile. In this manner, a specific type of GMA is selected and customized according to the parameters and/or functions contained in the pluggable GMA.

The configured and customized general-purpose GMA is then used to perform gamut mapping on the color image data by utilizing the gamut boundary descriptions corresponding to the input and output devices (step S608). In this manner, the color image data is brought within the gamut boundary of the output device which is described by the gamut boundary description in the output device color profile. The color image data is still in the device and viewing condition independent color space and therefore must be transformed into the color space of the output device prior to being rendered on the output device. Therefore, the color translation table corresponding to the output device is accessed from the output device color profile in step S609. The color translation table is used to convert the color image data from the device and viewing condition independent color space to the output device color space, such as CMYK, in step S610. The color image data is now in the output device color space and is also within the color gamut boundary of the output device. The color image data is then sent to the output device in step S611 for rendering on the output device.

Figure 7:
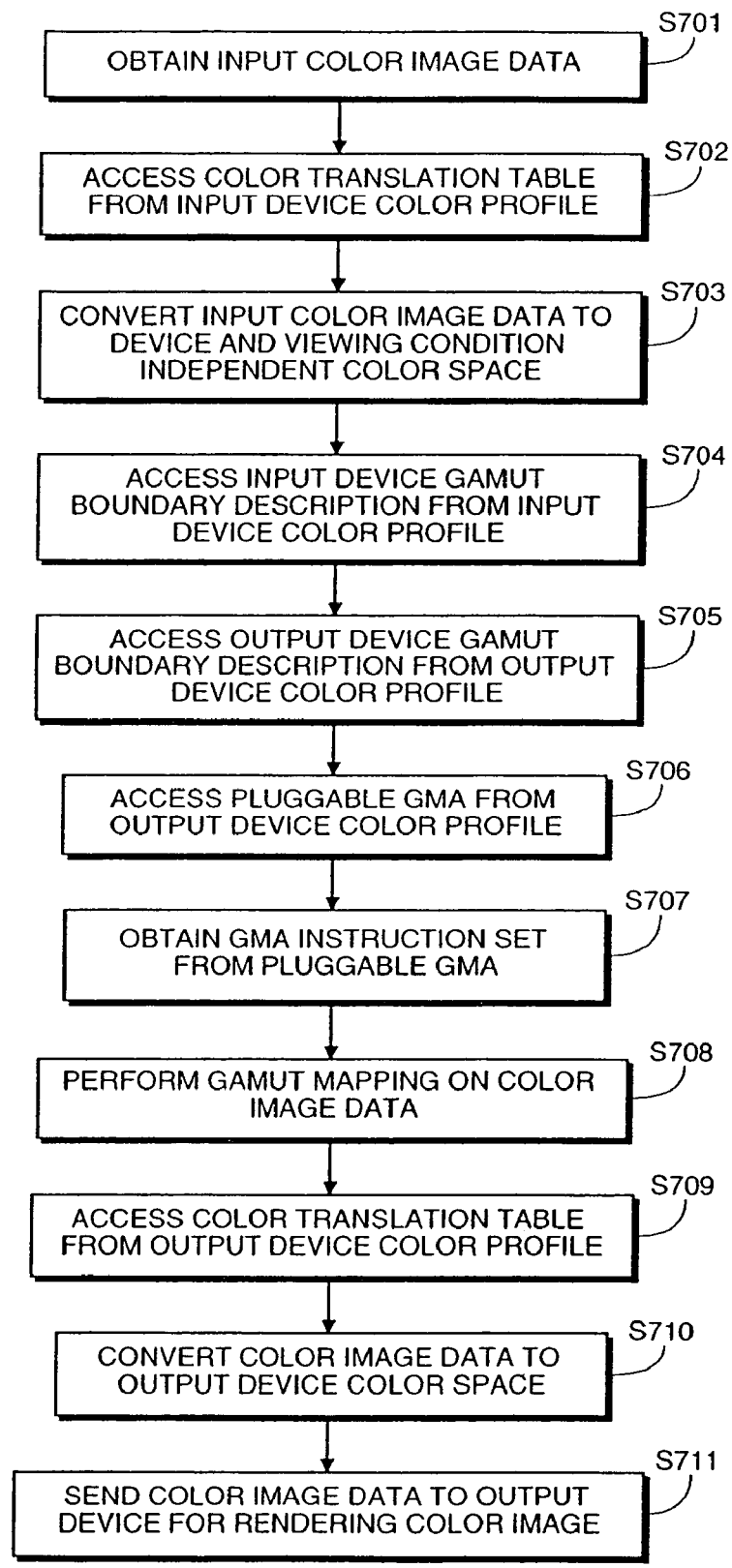
FIG. 7 is a flowchart for providing a detailed explanation of a color management system according to a second embodiment of the invention.

FIG. 7 provides a flowchart for explaining a color management system for transforming color image data using a pluggable gamut mapping algorithm according to the embodiment of the present invention depicted in FIG. 5B. In general, the color management system described by the flowchart in FIG. 7 obtains input color image data and then transforms the input color image data into a device and viewing condition independent color space. A pluggable gamut mapping algorithm containing a GMA instruction set which comprises a self-contained computer-readable gamut mapping algorithm is then obtained by the color management module. The GMA instruction set is then executed in order to gamut map the color image data by utilizing the gamut boundary descriptions of the input and output devices. After gamut-mapping, the color image data is transformed to the color space of the output device and is then sent to the output device to be rendered.

Turning to FIG. 7, input color image data is obtained which is in an input device color space which corresponds to the input device from which the color image data originated (step S701). As discussed above, the input color image data may have been obtained from scanner 70, digital camera 60, fixed disk 45, or from the Internet or world wide web via network interface bus 80. The color translation table corresponding to the input device is then accessed from the input device color profile in step S702. The color translation table is then used to convert the color image data from the input device color space to a device and viewing condition independent color space, which is commonly known as a profile connection space (PCS) (step S703). Once the color image data is transformed into the device and viewing condition independent color space, it is ready for gamut mapping to ensure that all data points of the color image data are within the gamut boundary of the output device. In preparation for performing gamut mapping, the gamut boundary description of the input device is accessed from the input device color profile in step S704. Similarly, the gamut boundary description of the output device is accessed from the output device color profile in step S705.

In step S706, the color management module accesses the pluggable GMA from the output device color profile. Although the pluggable GMA is provided in the output device color profile in this example of the invention, the pluggable GMA may be provided in other color profiles, such as an abstract color profile, and also may be provided by other means such as an independent file stored on fixed disk 45 or on a CD-ROM, or may be obtained from the Internet or world wide web via network interface bus 80. In addition, pluggable GMAs may be provided in more than one color profile, in which case the color management module must decide which pluggable GMA to use. The preferred order of preference for selecting which pluggable GMA to use is illustrated in detail in FIG. 8 and is discussed further below. The pluggable GMA accessed from the output device color profile contains a GMA instruction set containing a list of instructions for carrying out a gamut mapping algorithm as depicted in FIG. 5B. As discussed above, the GMA instruction set is a computer-readable set of instructions for providing a self-contained gamut mapping algorithm to the CMM from an external source. The GMA instruction set may be in the form of compiled, computer-executable steps, or may be in the form of computer-readable interpretive code such as JAVA or BASIC. In step S707, the GMA instruction set is obtained from the pluggable GMA. In this manner, a specific GMA is provided to the CMM from an external source, such as a color profile.

The GMA instruction set is then executed to perform gamut mapping on the color image data by utilizing the gamut boundary descriptions corresponding to the input and output devices (step S708). In this manner, the color image data is brought within the gamut boundary of the output device which is described by the gamut boundary description in the output device color profile. The color image data is still in the device and viewing condition independent color space and therefore must be transformed into the color space of the output device prior to being rendered on the output device. Therefore, the color translation table corresponding to the output device is accessed from the output device color profile in step S709. The color translation table is used to convert the color image data from the device and viewing condition independent color space to the output device color space, such as CMYK, in step S710. The color image data is now in the output device color space and is also within the color gamut boundary of the output device. The color image data is then sent to the output device in step S711 for rendering on the output device.

Although the embodiments depicted in FIGS. 6 and 7 obtain the pluggable GMA from the output device color profile, the pluggable GMA may be provided in any one of several color profiles which are accessible by the color management module. For example, the pluggable GMA may be provided in an abstract color profile which is used to transform color image data from an input color space to an output color space by using an abstract transform such as a transform that makes all colors darker. Abstract color profiles can therefore be used for artistic and creative color image data transformations which do not correspond to a specific color image device. Therefore, the color management module preferably possesses selection logic for determining which pluggable GMA to use when more than one GMA is found by the color management module.

Figure 8:
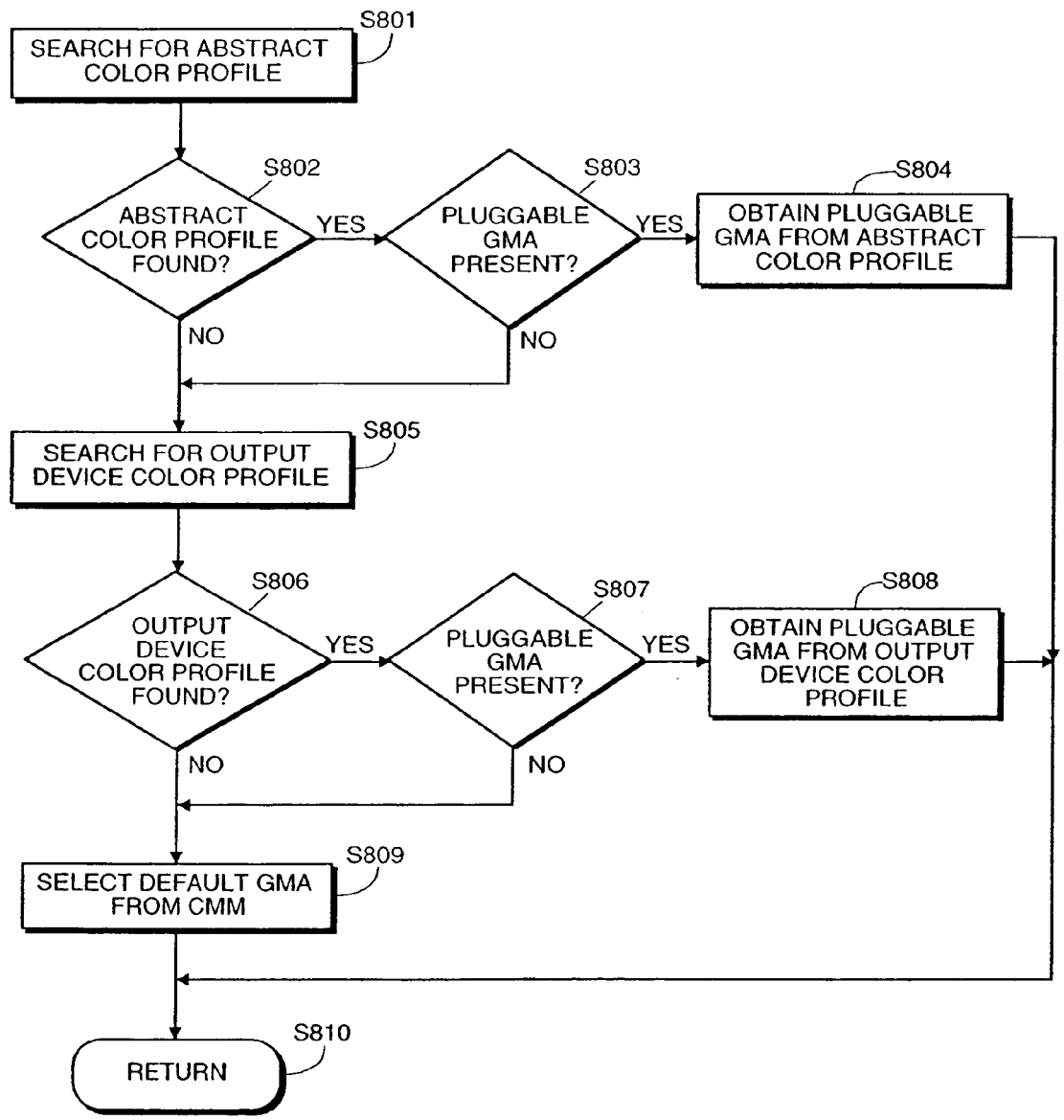
FIG. 8 is a flowchart for providing a detailed explanation of the selection of a gamut mapping algorithm according to a preferred embodiment of the invention.

An example of this selection logic is provided in FIG. 8. Specifically, the color management module (CMM) first searches for the presence of an abstract color profile in step S801. In step S802 it is determined whether or not an abstract color profile has been found. If an abstract color profile has been found, it is inspected to determine whether a pluggable GMA is present in step S803. If a pluggable GMA is present in the abstract color profile, it is obtained from the abstract color profile in step S804, upon which process flow passes to return in step S810. In this manner, an abstract color profile is the first preferred location for obtaining a pluggable GMA for use in the color management system of the present invention. If a pluggable GMA is not present in the abstract color profile, or if an abstract color profile cannot be found, process flow passes to step S805 in which the color management module searches for an output device color profile.

In step S806 it is determined whether or not an output device color profile has been found. If an output device color profile has been found., it is inspected in step S807 to determined whether a pluggable GMA is present. If a pluggable GMA is present in the output device color profile, it is obtained from the output device color profile in step S808, after which process flow passes to return in step S810. Therefore, it can be seen that the output device color profile is the second preferred location for obtaining a pluggable GMA for use in the color management system. If an output device color profile cannot be found, or if the output device color profile does not contain a pluggable GMA, process flow passes to step S809 in which the color management module selects the default GMA contained in the color management module for subsequent use in the color management system. Process flow then passes to return in step S810. In this manner, the color management module searches for the presence of abstract color profiles and output device color profiles and selects a pluggable GMA from one of the color profiles based on a predetermined order of priority. It can be appreciated that the order of priority of selection of a pluggable GMA may be changed and/or modified to change the preferred order of selection of color profiles from which a pluggable GMA is obtained, and may also be modified to add other sources for obtaining a pluggable GMA, such as an input color profile, an independent file on fixed disk 45 or CD-ROM, or from a remote location accessed via network interface bus 80 such as the Internet or world wide web.

The present invention therefore provides a means for an independent developer to select, control and customize a gamut mapping algorithm for use in color management of color image data such that the independent developer is no longer dependent on the gamut mapping algorithm provided by the developers of the color management module. Therefore, a specific type of gamut mapping algorithm can be selected and customized to obtain optimum results when mapping color image data to be within the color gamut boundary of a specific color image device, such as a monitor or color bubble-jet printer.

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. A color management apparatus which transforms input color image data into output color image data based on information contained in at least one color profile, said color management apparatus comprising:

an interface for externally receiving a gamut mapping condition;

a first transformer for transforming input color image data from input device-dependent space into device-independent color space;

a mapper for mapping the color image data represented in the device-independent color space into a gamut boundary of the output device by using said gamut mapping condition; and a second transformer for transforming the gamut mapped color image data from the device-independent color space into an output device-dependent color space by using the device color profile, wherein the device independent color space is viewing condition independent, and wherein said first transformer uses a color appearance model.

2. A color management apparatus according to claim 1, wherein said gamut mapping condition is a gamut mapping algorithm.

3. A color management method which transforms input color image data into output color image data based on information contained in at least one color profile, said color management method comprising the steps of:

defining an interface for externally receiving a gamut mapping condition;

transforming input color image data from input device-dependent space into device-independent color space;

mapping the color image data represented in the device-independent color space into a gamut boundary of the output device by using said gamut mapping condition; and transforming the gamut mapped color image data from the device-independent color space into an output device-dependent color space by using the device color profile, wherein the device independent color space is viewing condition independent, and wherein said transforming step uses a color appearance model.

4. A color management method according to claim 3, wherein said gamut mapping condition is a gamut mapping algorithm.

\* \* \* \* \*